US008661554B2

(12) United States Patent
Nakajima et al.

(10) Patent No.: US 8,661,554 B2
(45) Date of Patent: Feb. 25, 2014

(54) CONTROLLING PROGRAM, IMAGE FORMING APPARATUS AND PRINT CONTROLLING METHOD

(75) Inventors: Takeshi Nakajima, Hino (JP); Koichi Kitamoto, Machida (JP); Hirohiko Yamazaki, Machida (JP); Tsuyoshi Yoneyama, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 1462 days.

(21) Appl. No.: 12/057,256

(22) Filed: Mar. 27, 2008

(65) Prior Publication Data

US 2008/0320604 A1    Dec. 25, 2008

(30) Foreign Application Priority Data

Jun. 25, 2007 (JP) ................. 2007-166654

(51) Int. Cl.
  *G06F 21/10*    (2013.01)
(52) U.S. Cl.
  USPC ........................................................... 726/28
(58) Field of Classification Search
  USPC .......... 726/2, 5, 9, 19, 27–31; 358/3.22, 3.23, 358/3.28, 405, 426; 713/165, 182; 347/3–5; 355/40
  See application file for complete search history.

(56) References Cited

U.S. PATENT DOCUMENTS

| 7,627,118 B2 * | 12/2009 | Kanai ........................... 380/203 |
| 7,791,762 B2 * | 9/2010 | Sato ............................... 358/1.9 |
| 7,921,284 B1 * | 4/2011 | Kinghorn et al. ............. 713/160 |
| 7,958,147 B1 * | 6/2011 | Turner et al. ................. 707/783 |

FOREIGN PATENT DOCUMENTS

| JP | 2003-032487 | 1/2003 |
| JP | 2006-260023 | 9/2006 |
| JP | 2007-142941 | 6/2007 |

OTHER PUBLICATIONS

Notice of the OA issued by JPO on Jun. 3, 2009, in connection with Appl. No. 2007-166654, 2 pgs.
Translation of a Notice of the OA issued by JPO on Jun. 3, 2009, in connection with Appl. No. 2007-166654, 2 pgs.

* cited by examiner

*Primary Examiner* — Joseph P. Hirl
*Assistant Examiner* — Leynna Truvan
(74) *Attorney, Agent, or Firm* — Squire Sanders (US) LLP

(57) ABSTRACT

There is described an image forming apparatus, which makes it possible to securely prevent the secret information from leaking out to unauthorized personnel. The apparatus includes: a display section to display a first document that includes secret information; an operating section to designate a concealing position in the first document and establish a disclosable range of the secret information, therefrom; a storage control section to store document data, designation positional information and disclosable range information, while correlating them with each other; an authenticating section to determine whether or not a user coincides with the disclosable range, based on identification information of the user; and a printing section to print either at least a copy of the first document, when the user coincides with the disclosable range, or copies of a second document, when the authenticating section determines that the user does not coincide with the disclosable range.

16 Claims, 11 Drawing Sheets

PRINT CONTROLLING SYSTEM

PRINT CONTROLLING SYSTEM

FIG. 9 (a)

50: CONCEALING POSITION DESIGNATION SCREEN

ABC COMPANY MANAGEMENT INFORMATION

A B C D E , F G H I J
K L M N O , [P Q R S T]
U V W X Y , E D C B A
[J I H G F,] O N M L K

SALES AMOUNT OF INDIVIDUAL SECTION

| SECTION | SALES AMOUNT |
|---|---|
| A | $1000000 |
| B | $500000 |
| C | $200000 |
| D | $1500000 |
| E | $100000 |

FIG. 9 (b)

50: CONCEALING POSITION DESIGNATION SCREEN

ABC COMPANY MANAGEMENT INFORMATION

A B C D E , F G H I J
K L M N O , [P Q R S T]
U V W X Y , E D C B A
[J I H G F,] O N M L K

CONCEALED AREA

SALES AMOUNT OF INDIVIDUAL SECTION

| SECTION | SALES AMOUNT |
|---|---|
| A | $1000000 |
| B | $500000 |
| C | $200000 |
| D | $1500000 |
| E | $100000 |

FIG. 10 (a)

51: DISCLOSABLE RANGE SETTING SCREEN

ABC COMPANY MANAGEMENT INFORMATION

A B C D E , F G H I J
K L M N O , [P Q R S T]
U V W X Y , E D C B A
[J I H G F] , O N M L K

SALES AMOUNT OF INDIVIDUAL SECTION

| SECTION | SALES AMOUNT |
|---|---|
| A | $1000000 |
| B | $500000 |
| C | $200000 |
| D | $1500000 |
| E | $100000 |

DISCLOSABLE RANGE

- ☐ EQUAL TO OR HIGHER THAN EXECUTIVE DIRECTOR
- ☐ EQUAL TO OR HIGHER THAN DIRECTOR
- ☐ EQUAL TO OR HIGHER THAN MANAGER
- ■ EQUAL TO OR HIGHER THAN CHIEF
- ☐ REGULAR STAFF

FIG. 10 (b)

51: DISCLOSABLE RANGE SETTING SCREEN

ABC COMPANY MANAGEMENT INFORMATION

A B C D E , F G H I J
K L M N O , [P Q R S T]
U V W X Y , E D C B A
[J I H G F] , O N M L K

SALES AMOUNT OF INDIVIDUAL SECTION

| SECTION | SALES AMOUNT |
|---|---|
| A | $1000000 |
| B | $500000 |
| C | $200000 |
| D | $1500000 |
| E | $100000 |

DISCLOSABLE RANGE

- ☐ USER A
- ■ USER B
- ■ USER C
- ☐ USER D
- ☐ USER E
- ☐ USER F
- ☐ USER G
- ☐ USER H
- ■ USER I
- ☐ USER J

FIG. 11 (a)

40: ORIGINAL DOCUMENT

ABC COMPANY MANAGEMENT INFORMATION

A B C D E , F G H I J
K L M N O , P Q R S T
U V W X Y , E D C B A
J I H G F , O N M L K

SALES AMOUNT OF INDIVIDUAL SECTION

| SECTION | SALES AMOUNT |
|---------|--------------|
| A | $1000000 |
| B | $500000 |
| C | $200000 |
| D | $1500000 |
| E | $100000 |

FIG. 11 (b)

40: ORIGINAL DOCUMENT

ABC COMPANY MANAGEMENT INFORMATION

A B C D E , F G H I J
K L M N O , PQRST
U V W X Y , E D C B A
JIHGF , O N M L K

SALES AMOUNT OF INDIVIDUAL SECTION

| SECTION | SALES AMOUNT |
|---------|--------------|
| A | $1000000 |
| B | $500000 |
| C | $200000 |
| D | $1500000 |
| E | $100000 |

FIG. 12 (a)

43: MODIFIED DOCUMENT

ABC COMPANY MANAGEMENT INFORMATION

A B C D E , F G H I J
K L M N O , █████
U V W X Y , E D C B A
█████ O N M L K

44: CONCEALED AREA

SALES AMOUNT OF INDIVIDUAL SECTION

| SECTION | SALES AMOUNT |
|---------|--------------|
| A       |              |
| B       | ███          |
| C       | ███          |
| D       |              |
| E       |              |

FIG. 12 (b)

43: MODIFIED DOCUMENT

ABC COMPANY MANAGEMENT INFORMATION

A B C D E , F G H I J
K L M N O ,
U V W X Y , E D C B A
O N M L K

SALES AMOUNT OF INDIVIDUAL SECTION

| SECTION | SALES AMOUNT |
|---------|--------------|
| A       |              |
| B       |              |
| C       |              |
| D       |              |
| E       |              |

CONTROLLING PROGRAM, IMAGE FORMING APPARATUS AND PRINT CONTROLLING METHOD

This application is based on Japanese Patent Application NO. 2007-166654 filed on Jun. 25, 2007, with Japan Patent Office, the entire content of which is hereby incorporated by reference.

BACKGROUND OF THE INVENTION

The present invention relates to a controlling program, an image forming apparatus and a print controlling method, and specifically relates to a controlling program, an image forming apparatus and a print controlling method, each of which has a function for controlling a printing operation of a document including secret information.

In recent years, there have been increasingly proliferated in the market various kinds of copiers or multi-functional apparatuses (such as a MPF: Multi Function Peripheral, etc.), each of which is provided with a combination of plural functions, such as a copy function, a facsimile function, a printer function, a scanner function, etc., and has been widely utilized in various offices, etc. (hereinafter, referred to as an image forming apparatus as a general term for each of them). The document to be printed by the image forming apparatus could be either such a document that all of its contents are opened to all users, or such a document that includes some secret information for which only a specific user is allowed to read. When printing the latter document, it is necessary to control the printing operation so as not to leak the secret information, included in the document concerned, to unauthorized personnel.

With respect to the print controlling operation mentioned in the above, Tokkai 2003-32487 (Japanese Non-Examined Patent Publication) sets forth an image forming method that includes: establishing a copy prohibited area while correlating it to a user ID (Identification) code, when the operator inputs the user ID code and inputs designation information by designating the copy prohibited area in the screen currently displaying an image concerned; displaying the copy prohibited area in an identifiable manner; and generating image data representing an image in which a copy prohibiting mark is synthesized with the copy prohibited area so as to output the generated image data.

According to the abovementioned image forming method set forth in Tokkai 2003-32487, when the inputted user ID code coincides with an ID code registered in advance corresponding to the copy prohibited area concerned, the printing operation is controlled so as to print the image in which the copy prohibiting mark is attached to the concerned image in the original document, while, when the inputted user ID code does not coincide with the ID code registered in advance, the printing operation is controlled so as not to print the concerned image as a whole, or to print an image in which the copy prohibited area concerned is excluded from the original image. Accordingly, it is possible to configure the image forming apparatus in such a manner that the information, recorded within the copy prohibited area, cannot be disclosed for an unauthorized user.

The abovementioned method, however, is effectively usable only under the condition that the relationship between the image forming apparatus and the user is kept in a one-to-one correspondence. Further, since the prior art reference of Tokkai 2003-32487 includes no such concept that a specific user makes a plurality of copies so as to distribute them to the other personnel, the authorized (or authenticated) user can make any number of copies, each of which includes the image in which the copy prohibiting mark is attached to the copy prohibited area. Therefore, there has been a problem that, if the authorized user has distributed the plurality of copies to the unauthorized personnel, it is impossible to prevent the leakage of the secret information.

SUMMARY OF THE INVENTION

To overcome the abovementioned drawbacks in conventional image forming systems, it is one of objects of the present invention to provide a controlling program, an image forming apparatus and a print controlling method, each of which makes it possible to securely prevent the secret information from leaking out to unauthorized personnel.

Accordingly, to overcome the cited shortcomings, at least one of the objects of the present invention can be attained by the controlling programs, the image forming apparatus and the print controlling method described as follows.

(1) According to a computer readable storage medium reflecting an aspect of the present invention, the computer readable storage medium stores a computer program that is executable by a computer to cause the computer to conduct operations for controlling a printing operation, the program being executable by a computer to cause the computer to perform a process comprising: determining whether or not a user, who instructs a printing operation of a first document that includes secret information, coincides with a disclosable range of the secret information, established in advance, based on identification information of the user; and printing either at least a copy of the first document, when determining that the user coincides with the disclosable range, or copies of a second document in which a partial area of the first document, indicated by a concealing position, is concealed and a number of which is equal to a total number of copies instructed by the user, when determining that the user does not coincide with the disclosable range.

(2) According to a computer readable storage medium reflecting another aspect of the present invention, the computer readable storage medium stores a computer program that is executable by a computer to cause the computer to conduct operations for controlling a printing operation, the program being executable by a computer to cause the computer to perform a process comprising: storing document data representing a first document that includes secret information, designation positional information indicating a concealing position in the first document and disclosable range information indicating the disclosable range of the secret information, while correlating the document data, the designation positional information and the disclosable range information with each other; determining whether or not a user, who instructs a printing operation of a first document that includes secret information, coincides with a disclosable range of the secret information, established in advance, based on identification information of the user; and printing either at least a copy of the first document, when determining that the user coincides with the disclosable range, or copies of a second document in which a partial area of the first document, indicated by the concealing position, is concealed and a number of which is equal to a total number of copies instructed by the user, when determining that the user does not coincide with the disclosable range.

(3) According to an image forming apparatus reflecting still another aspect of the present invention, the image forming apparatus comprises: a display section to display a first document that includes secret information; an operating section to designate a concealing position in the first document and establish a disclosable range of the secret information, therefrom; a storage control section to store document data representing the first document, designation positional information indicating the concealing position and disclosable range information indicating the disclosable range, while correlating the document data, the designation positional information and the disclosable range information with each other; an authenticating section to determine whether or not a user, who instructs a printing operation of the first document, coincides with the disclosable range specified by the disclosable range information correlated with the document data representing the first document, based on identification information of the user; a printing section to print a copy of a document based on document data thereof; and an output control section to control the printing section so as to print either at least a copy of the first document, when the authenticating section determines that the user coincides with the disclosable range, or copies of a second document in which a partial area of the first document, indicated by the concealing position, is concealed and a number of which is equal to a total number of copies instructed by the user, when the authenticating section determines that the user does not coincide with the disclosable range.

(4) According to a print controlling method reflecting yet another aspect of the present invention, the print controlling method comprises: displaying a first document that includes secret information; designating a concealing position in the first document and establishing a disclosable range of the secret information; storing document data representing the first document, designation positional information indicating the concealing position and disclosable range information indicating the disclosable range, while correlating the document data, the designation positional information and the disclosable range information with each other; determining whether or not a user, who instructs a printing operation of the first document, coincides with the disclosable range specified by the disclosable range information correlated with the document data representing the first document, based on identification information of the user; and printing either at least a copy of the first document, when determining that the user coincides with the disclosable range, or copies of a second document in which a partial area of the first document, indicated by the concealing position, is concealed and a number of which is equal to a total number of copies instructed by the user, when determining that the user does not coincide with the disclosable range.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 9($a$), FIG. 9($b$) show exemplary layouts of screens (concealing position designation screen) to be displayed on a displaying section of an image forming apparatus, embodied in the present invention;

FIG. 10($a$), FIG. 10($b$) show other exemplary layouts of screens (disclosable range setting screen) to be displayed on a displaying section of an image forming apparatus, embodied in the present invention;

FIG. 11($a$), FIG. 11($b$) show exemplary printouts of original documents, to be outputted in the present embodiment;

FIG. 12($a$), FIG. 12($b$) show exemplary printouts of modified documents, to be outputted in the present embodiment.

DETAILED DESCRIPTION OF THE PREFERRED EMBODIMENT

To overcome the abovementioned drawbacks in the conventional image forming apparatus, an image forming apparatus, embodied in the present invention as a preferred embodiment, is provided as either hardware, or software with: a storage control section to store original document data including secret information, designation positional information indicating a concealing position and disclosable range information indicating a disclosable range of the secret information, while correlating them with each other; an authenticating section to determining whether or not the user, who currently instruct the printing operation of the original document, coincides with the disclosable range specified by the disclosable range information correlated to the original document data concerned; and an output control section that prints one copy or a plurality of copies of the original document for the authenticated user and another plurality of modified copies, serving as the residual number of copies, in each of which a designated area of the original document is painted over with a certain color, when determining that the user coincides with the disclosable range, or prints all of the copies as the modified document, when determining that the user does not coincide with the disclosable range. As abovementioned, according to the present invention, when the user, who coincides with the disclosable range information, instructs the printing operation of the original document, since only one copy or the plurality of copies of the original document is/are printed according to the request of the authenticated user, it becomes possible to prevent the copies of the original document from distributing to the unauthorized personnel, and accordingly, it becomes possible to securely prevent the secret information from leaking out to the unauthorized personnel.

Embodiment

Figure 1:
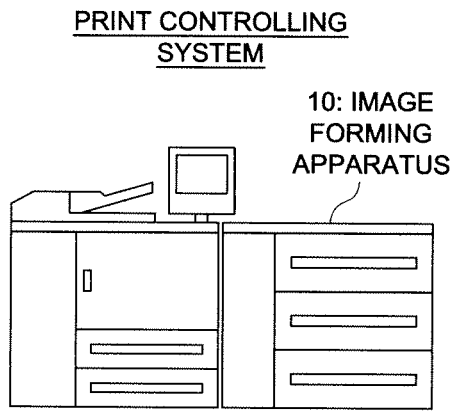
FIG. 1 shows a schematic diagram of a configuration of a print controlling system embodied in the present invention.
Figure 2:
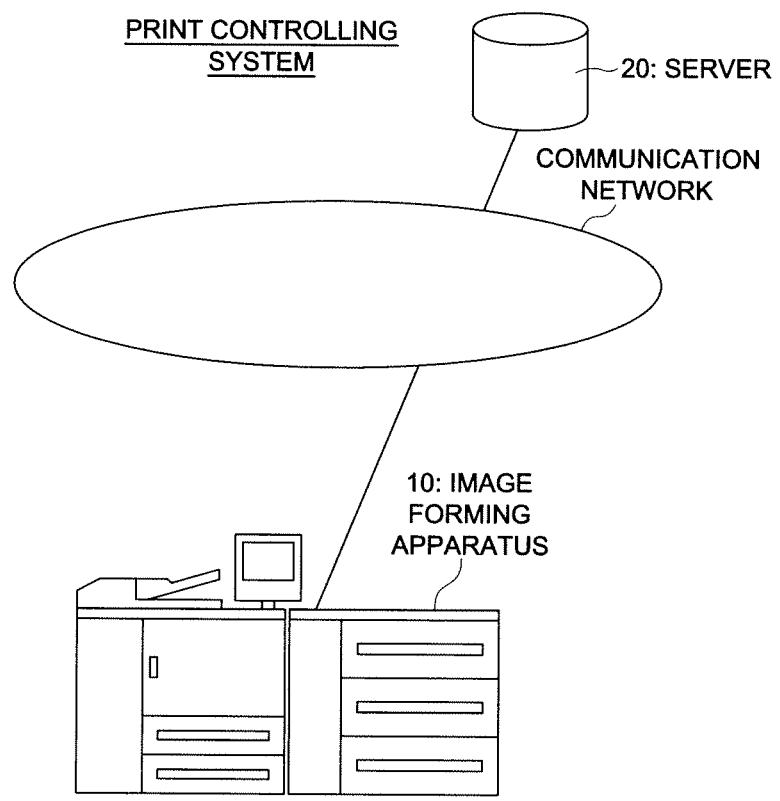
FIG. 2 shows a schematic diagram of another configuration of a print controlling system embodied in the present invention.
Figure 3:
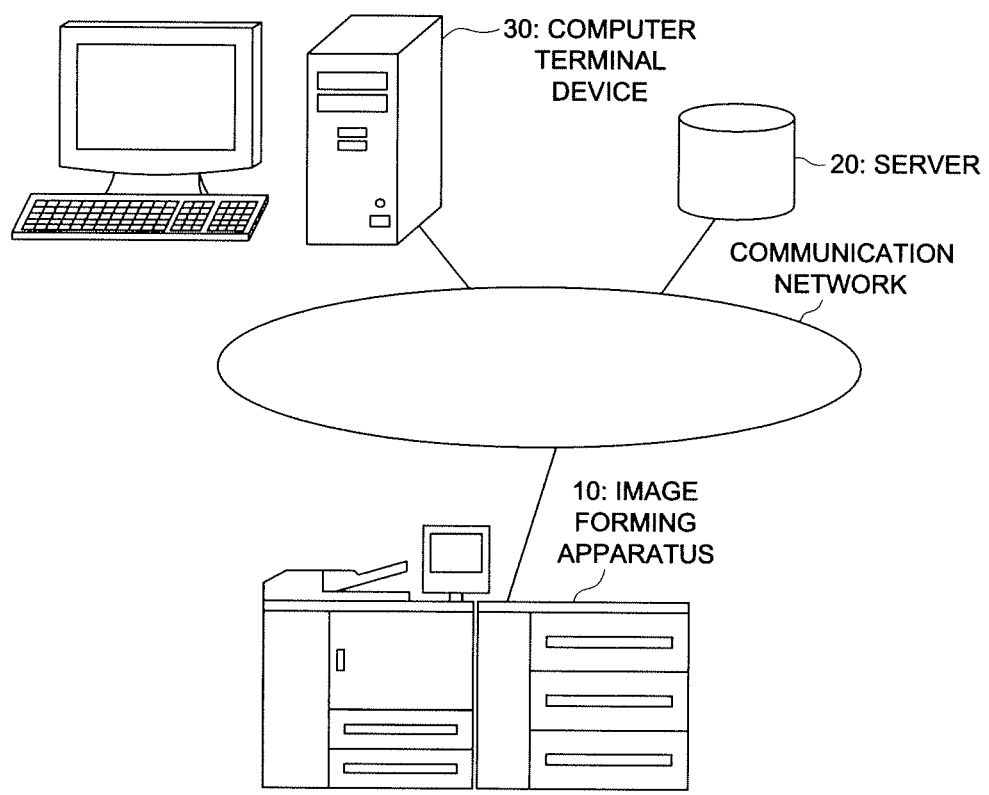
FIG. 3 shows a schematic diagram of still another configuration of a print controlling system embodied in the present invention.
Figure 4:
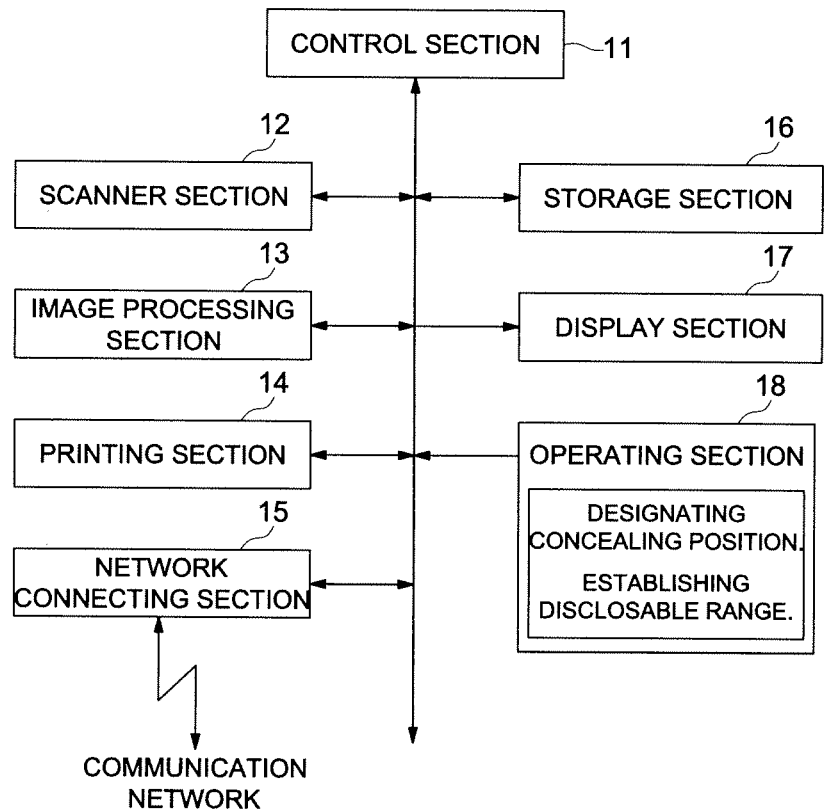
FIG. 4 shows a block diagram indicating a configuration of an image forming apparatus embodied in the present invention.
Figure 5:
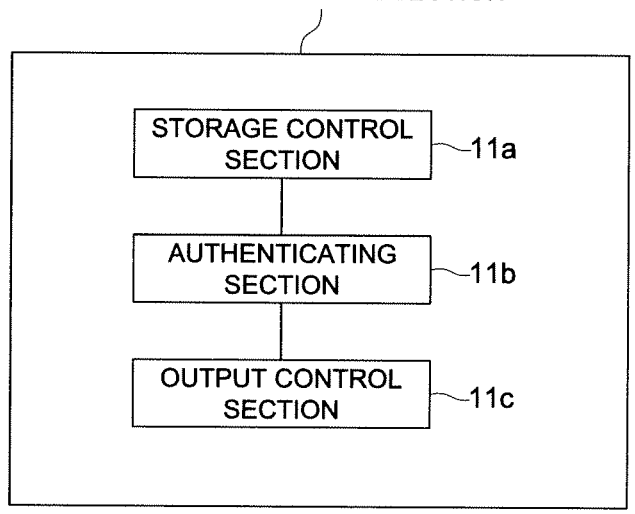
FIG. 5 shows a block diagram indicating a configuration of a control section provided in an image forming apparatus embodied in the present invention.
Figure 6:
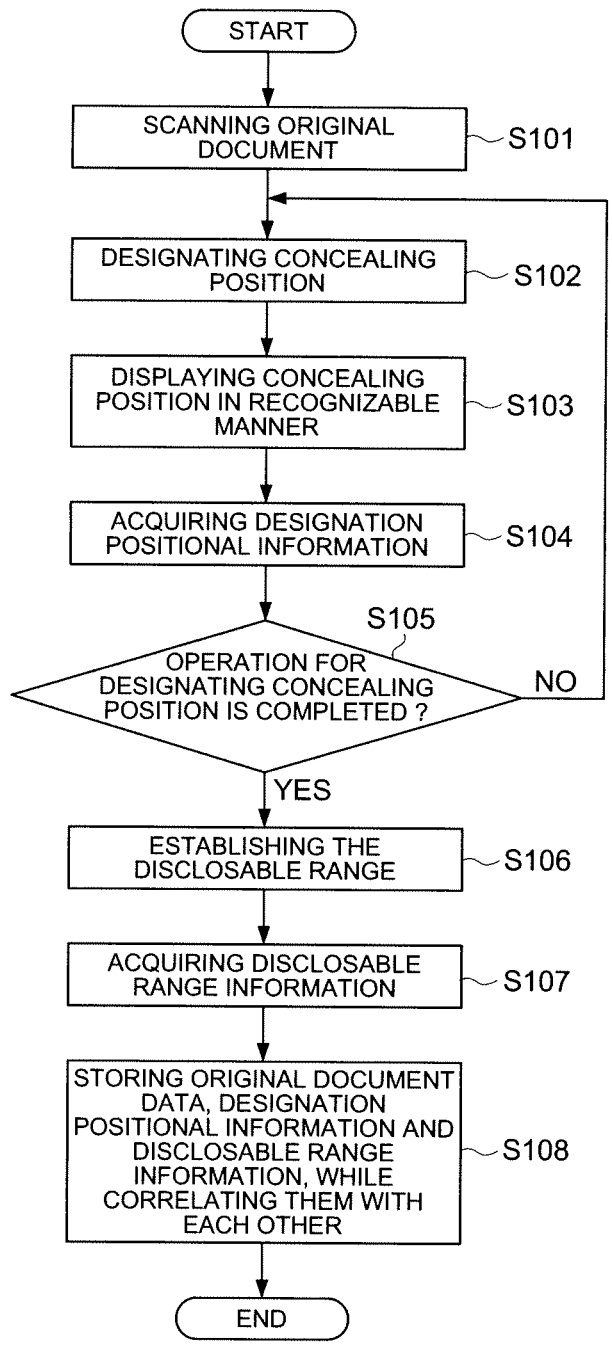
FIG. 6 shows a flowchart indicating procedures of creating a document and storing various kinds of data, to be conducted in a print controlling system embodied in the present invention.
Figure 7:
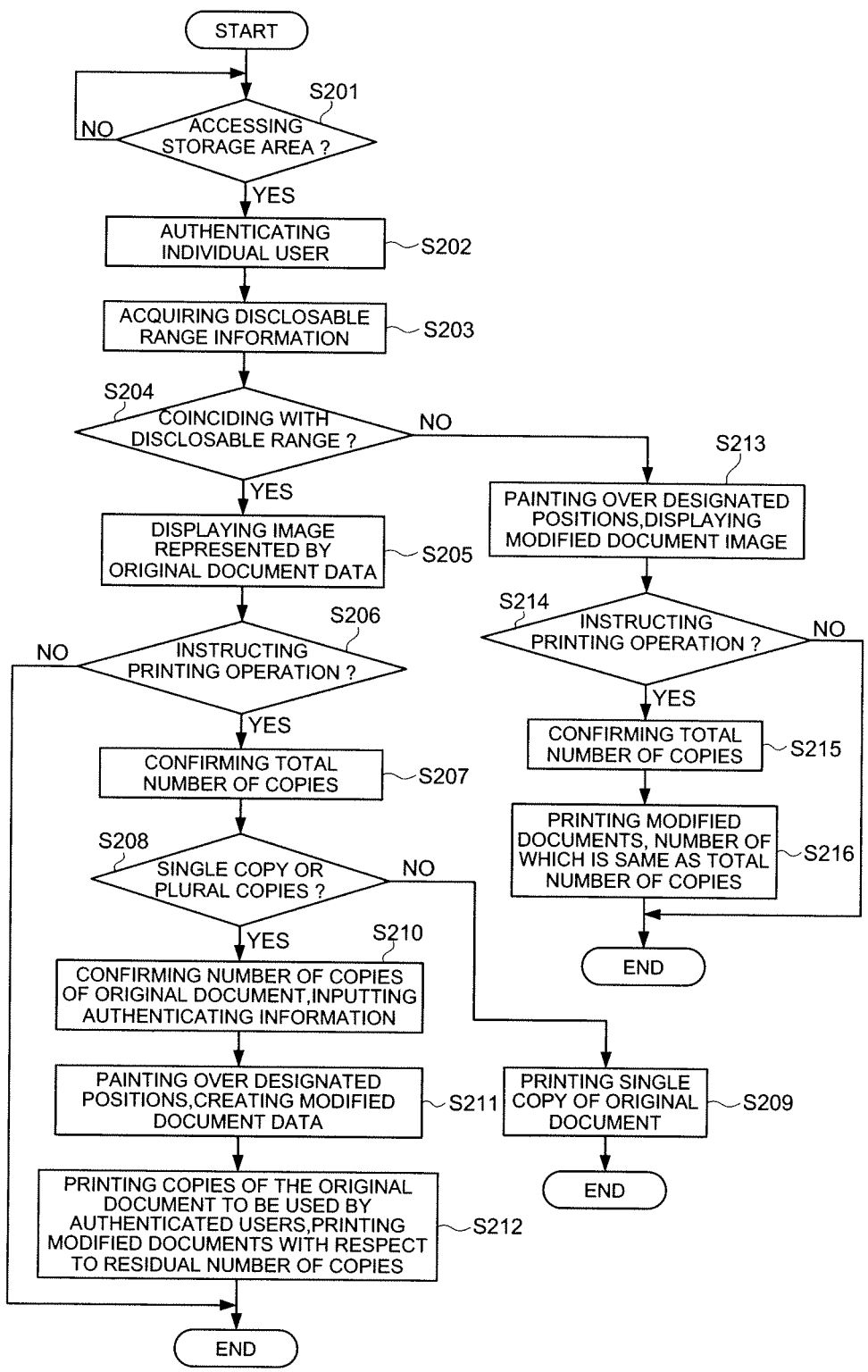
FIG. 7 shows a flowchart indicating a procedure of printing a document, to be conducted in a print controlling system embodied in the present invention.
Figure 8:
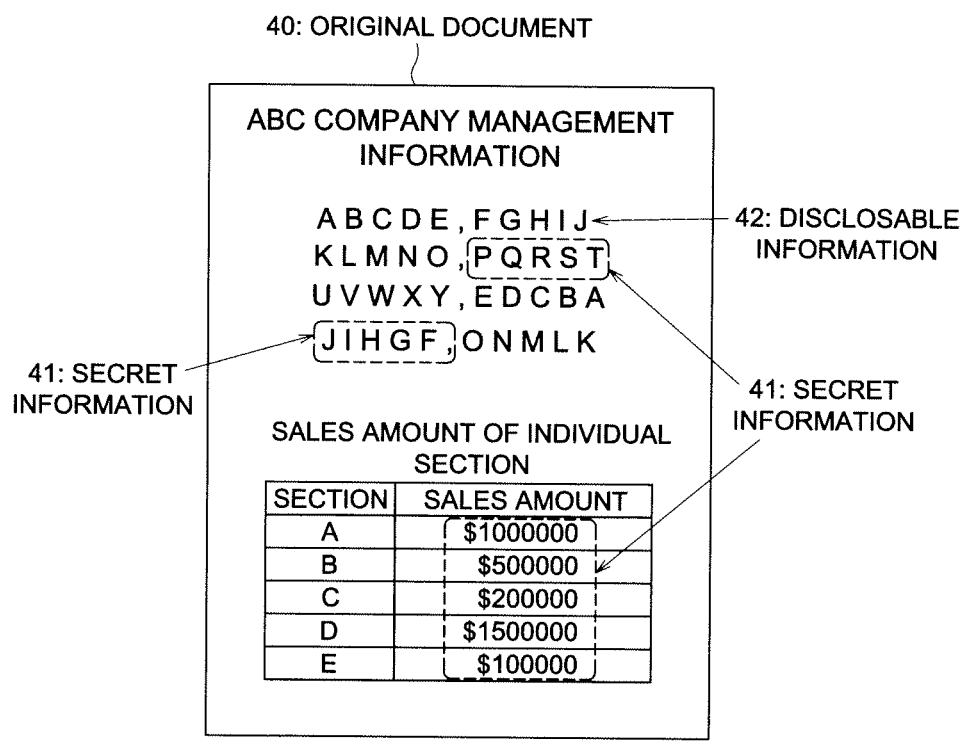
FIG. 8 shows an exemplary layout of an original document, to be employed in the present embodiment.
Figure 13:
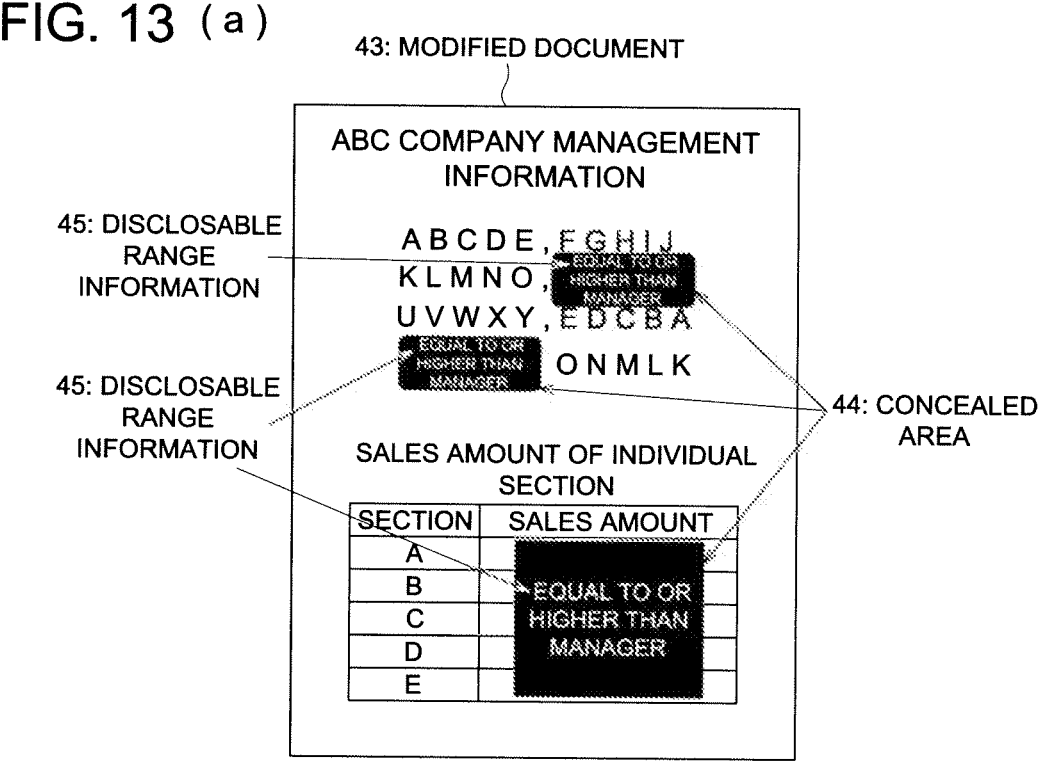
FIG. 13($a$), FIG. 13($b$) show other exemplary printouts of modified documents, to be outputted in the present embodiment.
Figure 13:
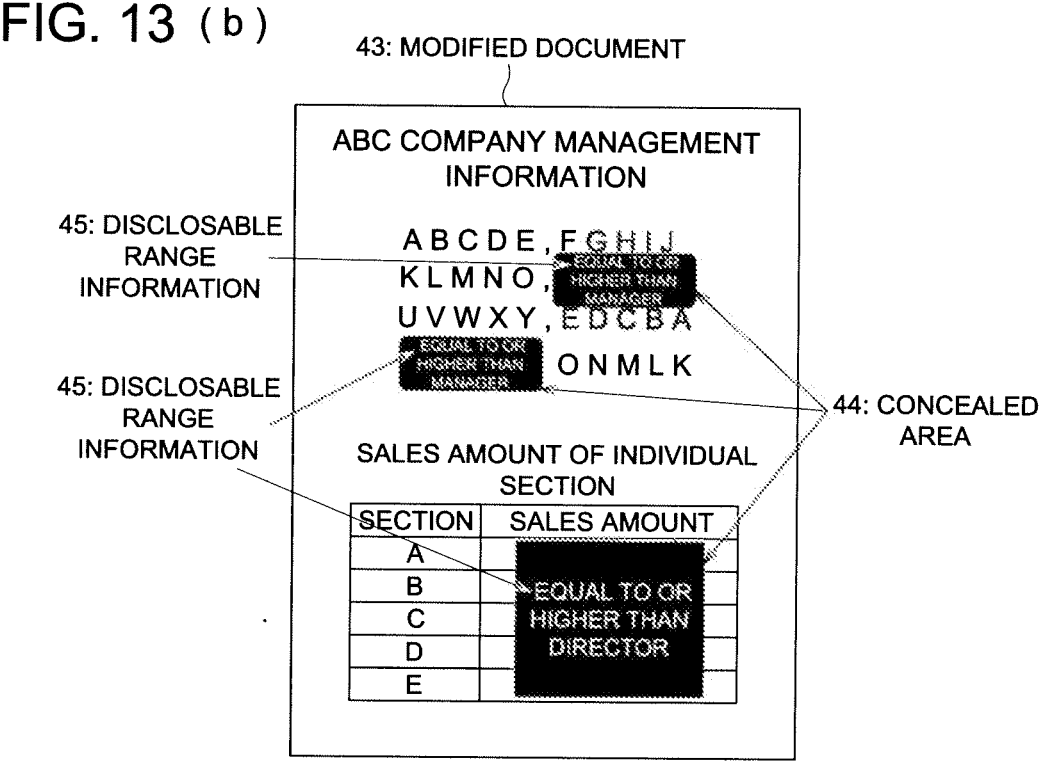

In order to further describe the preferred embodiment of the present invention in detail, referring to FIG. 1 through FIG. 13, a controlling program, an image forming apparatus, and a print controlling method, embodied in the present invention, will be detailed in the following. FIG. 1 through FIG. 3, show schematic diagrams of configurations of the print controlling system embodied in the present invention. Further, FIG. 4 shows a block diagram indicating a configuration of the image forming apparatus embodied in the present invention, and FIG. 5 shows a block diagram indicating a configuration of a control section provided in the image forming apparatus, embodied in the present invention. Still further, FIG. 6 shows a flowchart indicating procedures of creating a document and storing various kinds of data, to be conducted in the print controlling system embodied in the present invention, and FIG. 7 shows a flowchart indicating a procedure of printing a document, to be conducted in the print controlling system embodied in the present invention. Still further, FIG. 8 shows an exemplary layout of the original document, to be employed in the present embodiment, while each of FIG. 9(a), FIG. 9(b), FIG. 10(a) and FIG. 10(b) shows an exemplary layout of an image to be displayed on a displaying section of the image forming apparatus, embodied in the present invention. Yet further, each of FIG. 10(a) and FIG. 10(b) shows an exemplary printout of the original document, to be outputted in the present embodiment, while each of FIG. 12(a), FIG. 12(b), FIG. 13(a) and FIG. 13(b) shows an exemplary printout of a modified document to be outputted in the present embodiment.

As shown in FIG. 1, the print control system, embodied in the present invention, is constituted by an image forming apparatus 10 that conducts a print control operation for printing a first document (hereinafter, referred to as an original document) including such information that should be opened to only a specific (authorized) user having a reading authority with respect to the information concerned, or conducts another print control operations for printing a second document (hereinafter, referred to as a modified document) in which a designated area of the original document is concealed.

As shown in FIG. 4, the image forming apparatus 10 is provided with a control section 11, a scanner section 12, an image processing section 13, a printing section 14, a network connecting section 15, a storage section 16, a display section 17, an operating section 18, etc., which are coupled to each other through a bus.

The control section 11 is constituted by a CPU (Central Processing Unit), a ROM (Read Only Memory), a RAM (Random Access Memory), etc. In response to instructions inputted from the operating section 18, the CPU reads out various kinds of programs stored in the ROM so as to develop the readout programs onto the RAM, and controls various kinds of operations to be conducted by the abovementioned sections, according to the developed programs.

The scanner section 12 is constituted by a light source to emit a light beam scanning onto a document, a CCD (Charge Coupled Device) to convert intensity of the light beam, reflected from the document, to electric signals, and an analogue-to-digital converter to convert the electric signals to digital image data, so as to read the information recorded on the document, such as the original document, etc.

The image processing section 13 applies various kinds of image processing, such as a size expansion/reduction processing, an image rotation processing, a frequency conversion processing, a color conversion processing from RGB data to YMCK data, a gradation correction processing, etc., to the digital image data (hereinafter, also referred to as scanned image data) outputted by the scanner section 12.

The printing section 14 is provided with an image forming section to form an image to be transferred to a transfer material, a transfer section to transfer the formed image onto the transfer material, a fixing section to fix the transferred image onto the transfer material, a conveyance section to convey the transfer material, various cleaning sections that individually clean the image forming section, the transfer section and the fixing section, respectively, etc., so as to form the image onto the transfer material, based on the digital image data inputted, through the processes of the electro-photographic method, and to output the transfer material fixed with the formed image.

The network connecting section 15 includes various kinds of networking devices, such as a NIC (Network Interface Card), a modem, a LAN adaptor, a router, a TA (Terminal Adapter), etc., so as to conduct an operation for controlling the communication with an external apparatus coupled through the network.

The storage section 16 includes various kinds of storage devices, such as a flash memory, a HDD (Hard Disc Drive), etc., so as to store various kinds of data, setting conditions, etc., therein. Specifically in the present embodiment, the storage section 16 stores document data of the original document (hereinafter, referred to as original document data), information for indicating a position designated by the user with respect to the original document (hereinafter, referred to as designation positional information), information (hereinafter, referred to as a disclosable range information) indicating a range of authorized users for whom secret information are disclosable (hereinafter, referred to as a disclosable range), a table specifying the disclosable range, and authenticating information, such as an ID (identification) code, a password, etc., for authenticating a specific user, therein.

The display section 17 is constituted by a LCD (Liquid Crystal Display), an organic EL (electroluminescence) display device, etc., so as to display such a screen for indicating a concealing position of the original document read by the scanner section 12, a screen for setting the disclosable range, etc., on the display device. Further, the operating section 18 includes operating buttons, a mouse, etc., so as to make the operations for designating the concealing position in the original document and setting the disclosable range of the information recorded at the concealing position possible. In this connection, it is applicable that the display section 17 and the operating section 18 are configured as either separate devices or an integrated device in which the operating section 18, formed as a pressure sensitive touch panel having transparent electrodes aligned in a lattice pattern, is disposed over the display section 17. When employing the abovementioned touch panel, X-Y coordinates values at the forced point, pressed by a finger, a touch pen, etc., are detected by converting them to voltage values, the detected positional signals represented by the voltage values are outputted to the control section 11 as the operating signals.

Further, in addition to the operations for controlling the various kinds of sections included in the image forming apparatus 10, the control section 11 also serves as: a storage control section 11a to store the original document data, the designation positional information and the disclosable range information into a predetermined storage area, while correlating them with each other; an authenticating section 11b to determining whether or not the user, who currently instruct the printing operation of the original document, coincides with any one included in the disclosable range specified by the disclosable range information correlated to the original document data concerned, based on the discrimination information inputted by the user concerned; and an output control section 11c to conduct controlling operations, so as to print one copy or a plurality of copies of the original document to be provided only for the authenticated user, when determining that the user coincides with any one included in the disclosable range, or so as to print the modified copies in each of which the area specified by the designation positional information is concealed, with respect to all of the instructed number of copies, when determining that the user does not coincide with any one included in the disclosable range.

In this connection, it is applicable that a combination of the authenticating section 11b and the output control section 11c, or a combination of the storage control section 11a, the authenticating section 11b and output control section 11c, is configured as either hardware, or software serving as a control program to be executed by the CPU in the control section 11.

Further, although the configuration in which the original document data, the designation positional information and the disclosable range information are stored into the storage section 16 of the image forming apparatus 10, has been exemplified as the present embodiment, for instance as shown in FIG. 2, it is also applicable that the print controlling system is constituted by the image forming apparatus 10 and a server 20, which are coupled to each other through a communication network, such as a LAN (Local Area Network), a WAN (Wide Area Network), etc., and the original document data, the designation positional information and the disclosable range information are stored into a storage area provided in the apparatus other than the image forming apparatus 10.

Still further, the operations for creating the original document, designating the concealing position, setting the disclosable range, storing the original document data, the designation positional information and the disclosable range information, etc., can be also implemented by a computer device, such as a personal computer, etc. In such the case, as shown in FIG. 3, it is also possible that the print controlling system is constituted by the image forming apparatus 10, a computer terminal device 30 and the server 20 as needed, which are coupled to each other through the communication network, and the storage control section is provided as either hardware or software in a control section of the computer terminal device 30.

Referring to the flowchart shown in FIG. 6, the procedure for storing the original document data, the designation positional information and the disclosable range information, to be conducted in the abovementioned configuration of the image forming apparatus 10, will be detailed in the following.

Initially, the user sets an original document 40, on which both secret information 41 and information having no limitation for its disclosure (hereinafter, referred to as disclosable information 42) are printed as shown in FIG. 8, on the image forming apparatus 10, and operates the operating section 18 so as to instruct the scanning operation (Step S101). Then, the scanner section 12 scans the original document 40 with the light beam emitted from the light source, and the CCD receives the light beam reflected from the original document 40 so as to convert the received light beam to the electric signals. Successively, the analogue-to-digital converter converts the electric signals, outputted by the CCD, to the scanned image data, which represents the information recorded on the original document 40, and then, the control section 11 makes the display section 17 display a concealing position designation screen 50 as shown in FIG. 9(a), based on the scanned image data acquired in the above. In this connection, although the scanned image data is acquired by scanning the original document 40 in the abovementioned example, it is also applicable that the concealing position designation screen 50 is displayed on the display section 17, based on the original document data either stored in advance in the storage section 16 of the image forming apparatus 10 or received through the communication network. Further, it is also applicable in the print controlling system including the computer terminal device 30 that the original document data is created in the computer terminal device 30.

Successively, the user operates the operating section 18 so as to designate the concealing position (Step S102). The method for designating the concealing position is not specifically limited, and for instance, it is applicable to designate either a range of an area to be concealed, or start and final points of a line to be concealed, and further, to input coordinate values. Further, either a single point or plural points could be the concealing position(s).

Still successively, the control section 11 makes the display section 17 display the concealing position designated by the operating section 18 thereon, in such a manner that the user can clearly recognize it (Step S103). As well as the above, the method for displaying the concealing position is not specifically limited, and for instance, it is applicable to display the concealing position either by surrounding it with the frame as shown in FIG. 9(b) or by changing its color, and further, to add a certain distinguishable ornament, such as a halftone color, etc.

Still successively, the control section 11 acquires the designation positional information representing the concealing position, based on the information inputted from the operating section 18 (Step S104). In this connection, it is applicable that, when designating a range of an area to be concealed, the designation positional information indicates the coordinate values of its corner sections (in the case of a rectangular shaped area, the coordinate values at points on the diagonal), while, when designating start and final points of a line to be concealed, the designation positional information indicates the coordinate values of its start and final points.

Still successively, when the operation for designating the concealing position is completed (Step S105; Yes), the control section 11 makes the display section 17 display a disclosable range setting screen 51 (Step S106). This disclosable range setting screen 51 is to be utilized for specifying the range of the users for which the secret information is allowed to open, and its screen configuration is not specifically limited. For instance, it is applicable that plural disclosable ranges divided according to the specific groups, such as managerial positions, etc., are displayed in a selectable manner as shown in FIG. 10(a), or the names of the users are displayed in such a manner that a specific user, for whom the secret information is allowed to read, can be individually selected as shown in FIG. 10(b), and, otherwise, the combination of the abovementioned screen layouts is also applicable. Then, the user operates the operating section 18 so as to establish the disclosable range by checking the desired checkbox, etc. At that time, the user may establish either the same disclosable range for all of the designated positions or the plural disclosable ranges being different for every designated position.

Still successively, the control section 11 acquires the disclosable range information established on the basis of the information inputted from the operating section 18 (Step S107). In this connection, when the disclosable range should be always kept constant, the operation for designating the disclosable range can be omitted.

Yet successively, the storage control section 11a stores the original document data acquired in Step S101, the designation positional information acquired in Step S104 and the disclosable range information acquired in Step S107 into the storage section 16, etc., while correlating them with each other (Step S108). In this connection, although the abovementioned system is so constituted that the original document data, the designation positional information and the disclosable range information are stored in the storage section 16 of the image forming apparatus 10, for instance in the case of the print controlling system shown in FIG. 2, it is also applicable that the abovementioned data are stored in the server 20. Further, in the case of the print controlling system shown in FIG. 3, it is also applicable that the computer terminal device 30 conducts the operations for creating the original document data, designating the concealing position, establishing the disclosable range and storing the data thereof.

Next, referring to the flowchart shown in FIG. 7, the procedure for printing the document by employing the image forming apparatus 10 will be detailed in the following.

Initially, the user operates the operating section 18 so as to access the storage area (in this embodiment, storage section 16) in which the original document data, the designation positional information and the disclosable range information are stored while correlating them with each other, and inputs the authenticating information, such as a user ID, a password, etc., (Step S201).

Successively, the authenticating section 11b authenticates the user currently accessing, by comparing the user ID or the password, inputted by the user, with that stored in advance in the storage section 16 (Step S202). In this connection, an arbitral method can be employed for authenticating the user, and various methods, for instance, such as a method for putting an IC card in which the user ID code is recorded in the RFID (Radio Frequency Identification) tag over the RFID reader, mounted in advance on the image forming apparatus 10, so as to achieve the authentication of the user concerned, a method for reading a fingerprint of the user so as to achieve the authentication of the user concerned, etc., can be employed for this purpose.

Still successively, the authenticating section 11b acquires the disclosable range information, stored in correlation with the original document data, from its storage area (Step S203), and, referring to the table, etc., stored in advance in the storage section 16, determines whether or not the authenticated user coincides with the disclosable range specified by the disclosable range information (Step S204).

Still successively, when determining that the authenticated user coincides with the disclosable range (for instance, in the case that, when the disclosable range is specified as "more than the manager", the managerial position of the authenticated user is the manager or the director) (Step S204; Yes), the control section 11 reads out the original document data form its storage area so as to makes the display section 17 display the image represented by the original document data (Step S205).

Still successively, the user confirms the image represented by the original document data concerned, so as to determine whether or not the user should instruct the printing operation of the image. When the user instructs the printing operation of the image concerned (Step S206; Yes), the control section 11 makes the display section 17 display a print setting screen, etc., so that the user can confirm the number of copies inputted by himself (hereinafter, referred to as a total number of copies) (Step S207). Then, the control section 11 determines whether the total number of copies indicates a single copy or plural copies (Step S208).

Still successively, when determining that the total number of copies indicates a single copy (Step S208; No), the output control section 11c transmits the original document data to the printing section 14, so as to make the printing section 14 prints the original document 40 based on the original document data (Step S209). The printing mode of the original document 40 is not specifically limited, and accordingly, it is applicable that the originally scanned image is printed as it is, as shown in FIG. 11(a), or, based on the designation positional information read from the storage section 16, the designated areas are painted over with a halftone color and the information recorded on the designated positions are printed in the mode of the white characters on the halftone colored background, so that the user can easily recognize the designated positions in the original document 40. In this connection, as far as the designated positions and the information recorded on the designated positions are readable (or distinguishable) for the user, arbitral color can be employed as the halftone color of the background, or the color of the characters. Further, instead of painting over the designated areas with a halftone color, it is also applicable that the original document 40 is printed in such a manner that the color of the information in the designated areas is changed, or the designated areas is surrounded by the frame, or the like.

On the other hand, when determining that the total number of copies indicates plural copies (Step S208; Yes), there arises a fear that the copies of the original document 40 would be distributed to personnel having no reading authority, if the plural copies of the original document 40, corresponding to the total number of copies instructed by the user concerned, have been printed. Accordingly, in order to eliminate such the fear, even if the total number of copies indicates plural copies, the output control section 11c of the present embodiment controls the printing section 14 so as to print a single copy of the original document 40, and to print modified documents, detailed later, with respect to the residual number of copies, or, considering such a case that the original document 40 should be distributed to other personnel having the reading authority, so as to print plural copies, corresponding to the number of personnel having the reading authority, and to print the modified documents with respect to the residual number of copies.

Concretely speaking with respect to the latter case, the control section 11 makes the display section 17 display the print setting screen, etc., so as to confirm the number of copies of the original document 40, inputted by the user (hereinafter, referred to as a number of original document copies) (Step S210). When the number of original document copies is equal to or more than two copies, the control section 11 urges the other user, who is to be use the copy of the original document 40, to input the authenticating information. Then, the authenticating section 11b compares the authenticating information, currently inputted by the other user, with that stored in advance in the storage section 16, so as to determine whether or not the other user coincides with the disclosable range. For instance, when the number of original document copies is equal to three copies, the two copies of the original document 40 are to be used by two users other than the user who instruct the printing operation. Accordingly, the control section 11 urges the other two users to input the authenticating information, and the authenticating section 11b determines whether or not the other two users coincide with the disclosable range concerned.

Yet successively, when the number of original document copies is smaller than the total number of copies, the output control section 11c reads out the designation positional information from the storage section 16, so as to create modified document data representing a modified document image in which the designated positions (areas) are painted over with a predetermined color, such as a black color, etc., based on the designation positional information thereof, as shown in FIG. 12(a), (Step S211). Then, the output control section 11c transmits the modified document data to the printing section 14, so as to make the printing section 14 print the copies of the original document 40 to be used by the authenticated users, and print the modified documents 43 with respect to the residual number of copies (Step S212). For instance, when the total number of copies is equal to "N" copies, while the number of authenticated users (total number of the user who instruct the printing operation and the other users who use the copies of the original document 40) is equal to "n" users (when all of the users who input the authenticating information are authenticated, "N"="n"), the printing section 14 prints "n" copies of the original document 40 and "N-n" copies of the modified documents 43.

In this connection, when the number of authenticated users is equal to the total number of copies, the operation of Step S211 can be omitted, since it is unnecessary to print the modified documents 43. Further, the scope of the printing mode (or configuration) of the modified documents 43 is not limited to the example shown in FIG. 12(a). For instance, it is also applicable that a concealed area 44 is painted over with the color same as that of the paper sheet currently employed, or the information corresponding to the concealed area 44 are deleted, so as to print nothing on the concealed area 44, as shown in FIG. 12(b).

Further, only by viewing the modified documents 43 in which the concealed area 44 is painted over with the solid color, or is filled with nothing, the user cannot recognize whether or not he has the authority to read the secret information to be written in the concealed area 44. To overcome such the drawback, it is also possible for the output control section 11c to read out the disclosable range information from the storage section 16, so as to print disclosable range information 45 on the concealed area 44 in a recognizable mode (for instance, with colored or white characters being different from the background color), for instance as shown in FIG. 13(a). In that case, as shown in FIG. 13(b), it is also possible to print the disclosable range information 45 being different for every one of the concealed areas 44.

On the other hand, when determining that the user, who currently instructs the printing operation, does not coincide with the disclosable range (for instance, when the disclosable range indicates "equal to or higher than manager", but the managerial rank of the user is the chief) (Step S204; No), the output control section 11c reads out the designation positional information from the storage section 16, so as to create modified document data representing a modified document image in which the designated positions (areas) are painted over with a predetermined color, such as a black color, etc., based on the designation positional information thereof, and makes the display section 17 display the modified document image, represented by the modified document data, thereon (Step S213).

Successively, the user confirms the image represented by the modified document data concerned, so as to determine whether or not the user should instruct the printing operation of the image (Step S214). When the user instructs the printing operation of the image concerned (Step S214; Yes), the control section 11 makes the display section 17 display a print setting screen, etc., so that the user can confirm the total number of copies (Step S215). Then, the output control section 11c makes the printing section 14 to print the modified documents 43, a number of which is same as the total number of copies (Step S216).

As described in the foregoing, according to the present embodiment, since the original document data, the designation positional information and the disclosable range information are stored into the storage areas in such a manner that those can be correlated with each other; and, when the user who currently instructs the printing operation coincides with the disclosable range, the output control section controls the printing section, so as to print a single copy of the original document 40 or plural copies corresponding to the number of personnel having the reading authority, and to print the modified documents 43 with respect to the residual number of copies; and when the user does not coincide with the disclosable range, the output control section makes the printing section to print the modified documents 43 with respect to all of the copies (same as the total number of copies), it becomes possible not to distribute the copies of the original document 40 among personnel having no reading authority, and accordingly, it becomes possible to securely prevent the secret information from leaking out to unauthorized personnel.

In this connection, although the system of the aforementioned embodiment is so constituted that the image forming apparatus 10 conducts various print controlling operations, such as authenticating the user, printing the original document 40 and modified documents 43, etc., the scope of the present invention is not limited to the aforementioned embodiment. For instance, it is also applicable that the system is so constituted that the computer terminal device 30 conducts the operation for authenticating the user, and controls the image forming apparatus 10 so as to print the original document 40 and modified documents 43.

The present invention is available for a controlling program, an image forming apparatus and a print controlling method, each of which is provided with controlling functions for creating, storing and printing the document that includes the secret information.

According to the controlling program, the image forming apparatus and the print controlling method, embodied in the present invention, it becomes possible to securely prevent the secret information from leaking out to unauthorized personnel.

This is because, the document data representing the original document, the designation positional information designating the concealing position and the disclosable range information specifying the disclosable range are stored in the storage section, while correlating the document data, the designation positional information and the disclosable range information with each other, and, when the user instructs a printing operation of the first document, it is determined whether or not the concerned user coincides with the disclosable range specified by the disclosable range information correlated with the original document data, so that copies of the original document, a number of which is equal to the predetermined number, are printed, when determining that the user coincides with the disclosable range, or copies of the modified document, in which a partial area of the original document, indicated by the concealing position, is concealed, and a number of which is equal to the total number of copies, when determining that the user does not coincide with the disclosable range.

Further, according to the present invention, when the user, who coincides with the disclosable range, instructs an operation for printing plural copies of the first document, and inputs identification information of other users who are scheduled to use the copies of the original document, copies of the original document, a number of which is equal to a number of users who coincide with the disclosable range among the other users, are printed, while copies of the modified document are printed with respect to a residual number of copies. Accordingly, it becomes possible to prevent the copies of the original document from distributing to unauthorized personnel.

While the preferred embodiments of the present invention have been described using specific term, such description is for illustrative purpose only, and it is to be understood that changes and variations may be made without departing from the spirit and scope of the appended claims.

What is claimed is:

1. A non-transitory computer readable storage medium storing a computer program that is executable by a computer to cause the computer to conduct operations for controlling a printing operation, the program being executable by a computer to cause the computer to perform a process comprising:

determining whether or not a first user, who instructs a printing operation of a first document that includes secret information, coincides with a disclosable range of the secret information, based on a first identification information of the first user;

determining whether or not a number of copies to be printed for the first document, the printing operation of which is instructed by the first user, is established for plural copies;

requesting the first user to input a second identification information of a second user, being different from the first user who instructed the printing operation, when determining that the first user coincides with the disclosable range and when the number of copies to be printed for the first document is established as a plural number, in order to determine whether or not the second user coincides with the disclosable range established in advance, based on the second identification information inputted by the first user; and printing copies of the first document, a total number of which is derived by adding a number of copies for the first user and another number of copies for the second user, when the second user coincides with the disclosable range, while, printing the above-established total number of copies of a second document in which a designated area of the first document is concealed, when the first user does not coincide with the disclosable range.

2. The non-transitory computer readable storage medium of claim 1, wherein, when the first user instructs an operation for printing plural copies of the first document, based on other identification information of other users who are scheduled to use the plural copies of the first document and which are inputted by the first user, it is determined whether or not each of the other users coincides with the disclosable range in the determining step; and wherein, when determining that the user coincides with the disclosable range, copies of the first document, a number of which is equal to a number of users who coincide with the disclosable range among the other users, and copies of the second document with respect to a residual number of copies, are printed in the printing step.

3. The non-transitory computer readable storage medium of claim 1, wherein, when the first document is printed in the printing step, information to be recorded on the concealed area is printed in a recognizable (or an identifiable) manner.

4. The non-transitory computer readable storage medium of claim 1, wherein, when the second document is printed in the printing step, the disclosable range is printed over the secret information concealed at a position in a recognizable (or an identifiable) manner.

5. A non-transitory computer readable storage medium storing a computer program that is executable by a computer to cause the computer to conduct operations for controlling a printing operation, the program being executable by a computer to cause the computer to perform a process comprising:

storing document data representing contents of a first document that includes secret information, designation positional information indicating a concealed area, in which secret information is to be printed, in the first document and disclosable range information of the concealed area, while correlating the document data, the designation positional information and the disclosable range information with each other;

determining whether or not a first user, who instructs a printing operation of a first document that includes secret information, coincides with a disclosable range of the secret information, based on a first identification information of the first user; and determining whether or not a number of copies to be printed for the first document, the printing operation of which is instructed by the first user, is established for plural copies;

requesting the first user to input a second identification information of a second user, being different from the first user who instructed the printing operation, when determining that the first user coincides with the disclosable range and when the number of copies to be printed for the first document is established as a plural number, in order to determine whether or not the second user coincides with the disclosable range established in advance, based on the second identification information inputted by the first user; and printing copies of the first document, a total number of which is derived by adding a number of copies for the first user and another number of copies for the second user, when the second user coincides with the disclosable range, while, printing the above-established total number of copies of a second document in which a designated area of the first document is concealed, when the first user does not coincide with the disclosable range.

6. The non-transitory computer readable storage medium of claim 5, wherein, when the first user instructs an operation for printing plural copies of the first document, based on other identification information of other users who are scheduled to use the plural copies of the first document and which are inputted by the first user, it is determined whether or not each of the other users coincides with the disclosable range in the determining step; and wherein, when determining that the user coincides with the disclosable range, copies of the first document, a number of which is equal to a number of users who coincide with the disclosable range among the other users, and copies of the second document with respect to a residual number of copies, are printed in the printing step.

7. The non-transitory computer readable storage medium of claim 5, wherein, when the first document is printed in the printing step, information to be recorded at a position, designated by the designation positional information, is printed in a recognizable (or an identifiable) manner.

8. The non-transitory computer readable storage medium of claim 5, wherein, when the second document is printed in the printing step, the disclosable range is printed over the secret information concealed at a position, designated by the designation positional information, in a recognizable (or an identifiable) manner.

9. An image forming apparatus, comprising:

a display section to display a first document that includes secret information;

an operating section to designate a concealed area, in which secret information is to be printed, in the first document and establish a disclosable range of the concealed area;

a storage control section to store document data representing contents of the first document, designation positional information indicating a position of the concealed area and the disclosable range information representing the disclosable range, while correlating the document data, the designation positional information and the disclosable range information with each other;

an authenticating section to determine whether or not a first user, who instructs a printing operation of the first document, coincides with the disclosable range of the secret information, based on a first identification information of the first user;

a printing section to print a copy of a document based on document data thereof; and an output control section to control the printing section;

wherein the authenticating section determines whether or not a number of copies to be printed for the first document, the printing operation of which is instructed by the first user, is established for plural copies, and the output control section requests the first user to input second identification information of a second user, being different from the first user who instructed the printing operation, when the authenticating section determines that the first user coincides with the disclosable range and when the number of copies to be printed for the first document is established as a plural number, in order to determine whether or not the second user coincides with the disclosable range established in advance, based on the second identification information inputted by the first user; and wherein, when the authenticating section determines that the second user coincides with the disclosable range, the output control section controls the printing section so as to print copies of the first document, a total number of which is derived by adding a number of copies for the first user and another number of copies for the second user, while, when the authenticating section determines that the first user does not coincide with the disclosable range, the output control section controls the printing section so as to print the above-established total number of copies of a second document in which a designated area of the first document is concealed.

10. The image forming apparatus of claim 9, wherein, when the user instructs an operation for printing plural copies of the first document, based on other identification information of other users who are scheduled to use the copy of the first document and which are inputted by the user, the authenticating section determines whether or not each of the other users coincides with the disclosable range information of the concealed area; and wherein, when the authenticating section determines that the user coincides with the disclosable range information of the concealed area, the output control section to control the printing section so as to print copies of the first document, a number of which is equal to a number of users who coincide with the disclosable range information of the concealed area among the other users, and to print copies of the second document with respect to a residual number of copies.

11. The image forming apparatus of claim 9, wherein, when printing the first document, the output control section controls the printing section so as to print information to be recorded at a position, designated by the designation positional information, in a recognizable (or an identifiable) manner.

12. The image forming apparatus of claim 9, wherein, when printing the second document, the output control section controls the printing section so as to print the disclosable range information over the secret information, concealed at a position designated by the designation positional information, in a recognizable (or an identifiable) manner.

13. A print controlling method, comprising:

displaying a first document that includes secret information;

designating a concealed area, in which secret information is to be printed, in the first document and establishing a disclosable range of the concealed area;

storing document data representing contents of the first document, designation positional information indicating a position of the concealed area and the disclosable range information representing the disclosable range, while correlating the document data, the designation positional information and the disclosable range information with each other;

determining whether or not a first user, who instructs a printing operation of the first document, coincides with the disclosable range of the secret information, based on first identification information of the user; and determining whether or not a number of copies to be printed for the first document, the printing operation of which is instructed by the first user, is established for plural copies;

requesting the first user to input a second identification information of a second user, being different from the first user who instructed the printing operation, when determining that the first user coincides with the disclosable range and when the number of copies to be printed for the first document is established as a plural number, in order to determine whether or not the second user coincides with the disclosable range established in advance, based on the second identification information inputted by the first user; and printing copies of the first document, a number of which is derived by adding a number of copies for the first user and another number of copies for the second user, when the second user coincides with the disclosable range, while, printing the above-established number of copies of a second document in which a designated area of the first document is concealed, when the second user does not coincide with the disclosable range.

14. The print controlling method of claim 13,
wherein, when the first user instructs an operation for printing plural copies of the first document,
based on other identification information of other users who are scheduled to use the plural copies of the first document and which are inputted by the first user, it is determined whether or not each of the other users coincides with the disclosable range information of the concealed area in the determining step; and
wherein, when determining that the user coincides with the disclosable range information of the concealed area, copies of the first document, a number of which is equal to a number of users who coincide with the disclosable range information of the concealed area among the other users, and copies of the second document with respect to a residual number of copies, are printed in the printing step.

15. The print controlling method of claim 13,
wherein, when the first document is printed in the printing step, information to be recorded at a position, designated by the designation positional information, is printed in a recognizable (or an identifiable) manner.

16. The print controlling method of claim 13,
wherein, when the second document is printed in the printing step, the disclosable range is printed over the secret information concealed at a position, designated by the designation positional information, in a recognizable (or an identifiable) manner.

* * * * *